United States Patent
Yasuda et al.

(10) Patent No.: US 12,286,152 B2
(45) Date of Patent: Apr. 29, 2025

(54) STEERING WHEEL-BASED HMI SYSTEM

(71) Applicant: Toyota Research Institute, Inc., Los Altos, CA (US)

(72) Inventors: Hiroshi Yasuda, San Francisco, CA (US); Manuel Ludwig Kuehner, Mountain View, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 421 days.

(21) Appl. No.: 17/357,026

(22) Filed: Jun. 24, 2021

(65) Prior Publication Data

US 2022/0410971 A1    Dec. 29, 2022

(51) Int. Cl.
*B62D 15/02* (2006.01)
*B60K 37/00* (2006.01)
(Continued)

(52) U.S. Cl.
CPC ............ *B62D 15/025* (2013.01); *B60K 37/00* (2013.01); *B62D 5/006* (2013.01); *B62D 5/0463* (2013.01);
(Continued)

(58) Field of Classification Search
CPC ................. B60W 50/16; B62D 15/025; B62D 5/005–006
(Continued)

(56) References Cited

U.S. PATENT DOCUMENTS 6,655,490 B2 * 12/2003 Andonian .............. B62D 6/007
    180/402
7,124,027 B1 * 10/2006 Ernst, Jr. ................ B60W 30/09
    701/301
(Continued)

FOREIGN PATENT DOCUMENTS

DE          19818259 A1 * 11/1998 ............. B60Q 9/008
DE     102005036219 A1 *  2/2007 ............ B60W 50/16
(Continued)

OTHER PUBLICATIONS

Nerurkar, S., "Hands-Off Detection (HOD)—Crucial for Driver Assistance and Automated Driving Systems," LinkedIN (https://www.linkedin.com/pulse/hands-off-detection-hodcrucial- driver-assistance-driving-nerurkar/, accessed Mar. 12, 2021) (4 pages).
(Continued)

*Primary Examiner* — Logan M Kraft
*Assistant Examiner* — Joshua Campbell
(74) *Attorney, Agent, or Firm* — Christopher G. Darrow; Darrow Mustafa PC (57) ABSTRACT

A steering wheel-based HMI system for a vehicle includes a steer-by-wire system and a control module. The steer-by-wire system includes a steering wheel and a torque feedback unit mechanically connected to the steering wheel. The control module is communicatively connected to the torque feedback unit. The control module is configured to identify a communication, gather information about user securement of the steering wheel, and operate the torque feedback unit to apply a supplementary torque to the steering wheel for
(Continued)

haptically issuing the communication through the steering wheel. The supplementary torque has a magnitude that is scaled based on the information about user securement of the steering wheel.

20 Claims, 3 Drawing Sheets

(51) Int. Cl.
| | | |
|---|---|---|
| | *B62D 5/00* | (2006.01) |
| | *B62D 5/04* | (2006.01) |
| | *B62D 6/00* | (2006.01) |
| | *B60K 35/25* | (2024.01) |
| | *B60K 35/28* | (2024.01) |
| | *B60K 35/60* | (2024.01) |

(52) U.S. Cl.
CPC ........... *B62D 5/0481* (2013.01); *B62D 6/008* (2013.01); *B60K 35/25* (2024.01); *B60K 35/28* (2024.01); *B60K 35/60* (2024.01); *B60K 2360/178* (2024.01); *B60K 2360/782* (2024.01)

(58) Field of Classification Search
USPC .......................................................... 701/41
See application file for complete search history.

(56) References Cited

U.S. PATENT DOCUMENTS

| | | | |
|---|---|---|---|
| 9,132,839 B1* | 9/2015 | Tan | B60W 50/0098 |
| 9,889,873 B2 | 2/2018 | Lueke | |
| 10,399,591 B2 | 9/2019 | Chandy | |
| 10,502,616 B2* | 12/2019 | Clochard | H03K 17/9629 |
| 2007/0299580 A1* | 12/2007 | Lin | B60W 50/16 |
| | | | 701/41 |
| 2010/0228417 A1* | 9/2010 | Lee | B62D 15/025 |
| | | | 701/23 |
| 2014/0224040 A1* | 8/2014 | Van'tZelfde | B62D 1/046 |
| | | | 73/862.381 |
| 2019/0367075 A1* | 12/2019 | Kodera | B62D 5/003 |
| 2020/0043063 A1* | 2/2020 | London | G07C 5/008 |

FOREIGN PATENT DOCUMENTS

| | | | |
|---|---|---|---|
| DE | 102015009516 A1 | 1/2017 | |
| WO | WO-2018050377 A1 * | 3/2018 | ............ B60K 28/06 |
| WO | WO-2019106070 A1 * | 6/2019 | ............ B62D 5/001 |

OTHER PUBLICATIONS

Audi USA, "Audi Tech Tutorial: Lane Guidance," YouTube (https://www.youtube.com/watch?v=M3QV-iVgNCg, accessed Mar. 12, 2021) Dec. 28, 2018 (1 page).

* cited by examiner

STEERING WHEEL-BASED HMI SYSTEM

TECHNICAL FIELD

The embodiments disclosed herein relate to an HMI system for a vehicle and, more particularly, to an HMI system based on the steering wheel of a steer-by-wire system.

BACKGROUND

Some vehicles include human machine interface (HMI) systems. HMI systems enable users or drivers of vehicles to engage and interact with the vehicle. HMI systems for vehicles can include heads-up displays (HUDs), touch screens and infotainment systems, and voice recognition and voice guidance systems.

SUMMARY

Disclosed herein are embodiments of an HMI system based on the steering wheel of a steer-by-wire system.

In one aspect, an HMI system includes a steer-by-wire system and a control module. The steer-by-wire system includes a steering wheel and a torque feedback unit mechanically connected to the steering wheel. The control module is communicatively connected to the torque feedback unit. The control module is configured to identify a communication, gather information about user securement of the steering wheel, and operate the torque feedback unit to apply a supplementary torque to the steering wheel for haptically issuing the communication through the steering wheel. The supplementary torque has a magnitude that is scaled based on the information about user securement of the steering wheel.

In another aspect, a method of operating an HMI system for a vehicle involves a steering wheel and a torque feedback unit mechanically connected to the steering wheel. The method includes identifying a communication, calculating a supplementary torque for haptically issuing the communication through the steering wheel, and gathering information about user securement of the steering wheel. The method further includes scaling the supplementary torque based on the information about user securement of the steering wheel, and operating the torque feedback unit to apply the supplementary torque to the steering wheel.

In yet another aspect, an HMI system includes a steer-by-wire system, a steering wheel detection system, and a control module. The steer-by-wire system includes a steering wheel and a torque feedback unit mechanically connected to the steering wheel. The steering wheel detection system is configured to detect information about user securement of the steering wheel. The information about user securement of the steering wheel is indicative of a number of hands on the steering wheel. The control module is communicatively connected to the torque feedback unit and the steering wheel detection system. The control module is configured to operate the torque feedback unit to apply a baseline torque to the steering wheel for haptically simulating steering feel through the steering wheel, and apply a supplementary torque to the steering wheel for haptically issuing a driving maneuver suggestion through the steering wheel. The supplementary torque has an upscaled magnitude when the information about user securement of the steering wheel is indicative of two hands on the steering wheel. The supplementary torque has a downscaled magnitude when the information about user securement of the steering wheel is indicative of one hand on the steering wheel.

These and other aspects will be described in additional detail below.

BRIEF DESCRIPTION OF THE DRAWINGS

The various features, advantages and other uses of the present embodiments will become more apparent by referring to the following detailed description and drawing in which.

DETAILED DESCRIPTION

This disclosure teaches a steering wheel-based HMI system for a vehicle. The HMI system includes a steer-by-wire system that has a steering wheel and a torque feedback unit mechanically connected to the steering wheel. A control module is communicatively connected to the torque feedback unit and is configured to identify a communication, gather information about user securement of the steering wheel, and operate the torque feedback unit to apply a supplementary torque to the steering wheel for haptically issuing the communication through the steering wheel. The supplementary torque has a magnitude that is scaled based on the information about user securement of the steering wheel.

Figure 1A:
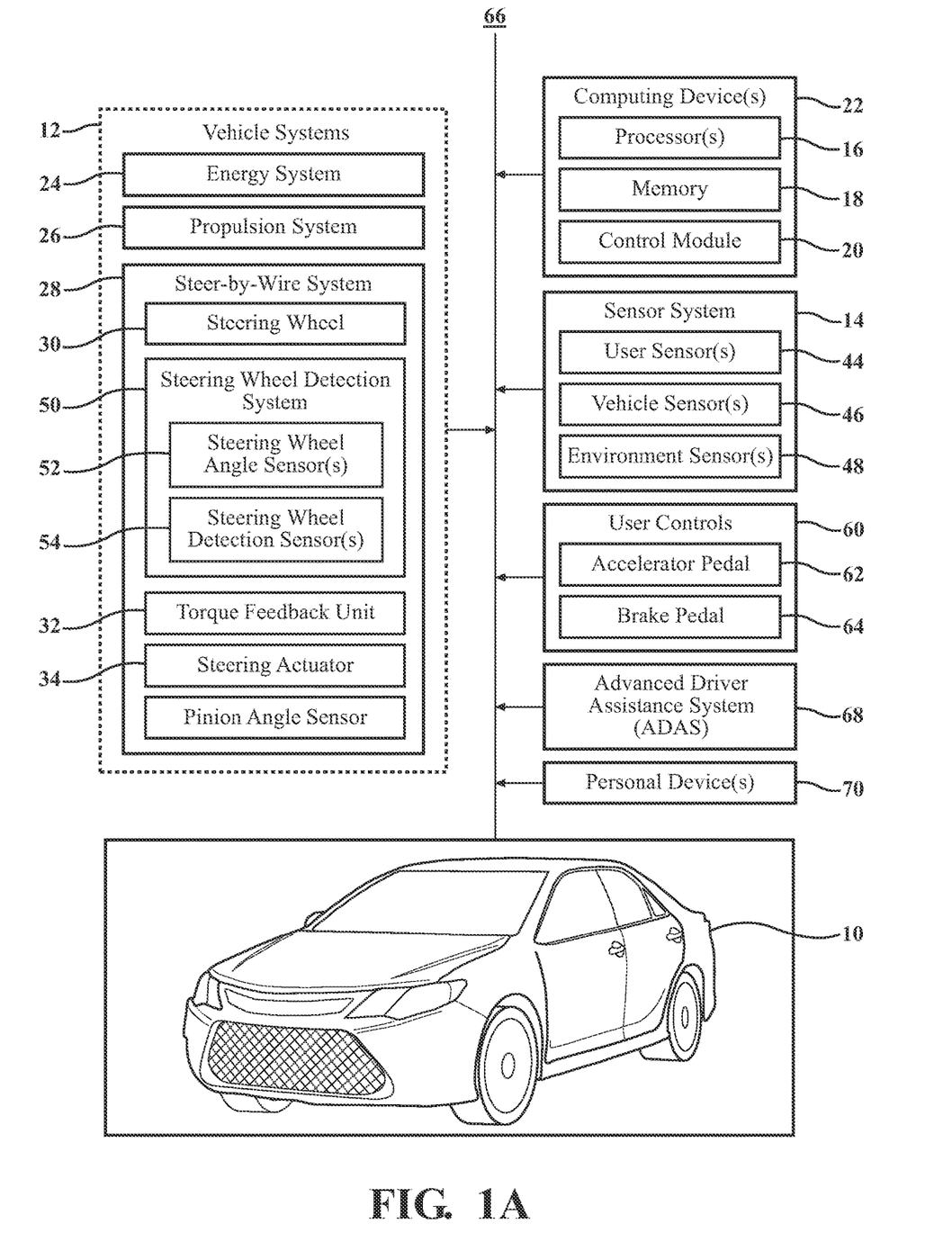
FIG. 1A is an example of an HMI system for a vehicle.

A representative passenger vehicle 10 is shown in FIG. 1A. The vehicle 10 includes an exterior and a number of interior compartments. The compartments include a passenger compartment, an engine compartment, a cargo area, and the like. The vehicle 10 includes a body that forms the exterior and defines the compartments. The body includes upright sides, a horizontal floor, a horizontal roof, an upright front end, an upright rear end, and the like.

Among other things, the vehicle 10 includes seats, a dash assembly, an instrument panel, user controls, and the like housed in the passenger compartment. Additionally, the vehicle 10 includes any combination of an engine, one or more motors, one or more transmissions, and other powertrain components housed in the engine compartment, underneath the floor, and elsewhere in the vehicle 10. Among the other powertrain components, the vehicle 10 includes wheels 42 (see FIG. 1B). The wheels 42 support the remainder of the vehicle 10 on the ground. One, some, or all of the wheels 42 are powered by the remainder of the powertrain components to drive the vehicle 10 along the ground.

The vehicle 10 includes one or more vehicle systems 12 operable to perform vehicle functions. In addition to the vehicle systems 12, the vehicle 10 includes a sensor system 14, as well as one or more processors 16, memory 18, and a control module 20 to which the vehicle systems 12 and the sensor system 14 are communicatively connected. The sensor system 14 is operable to detect information about the vehicle 10. The processors 16, the memory 18, and the control module 20 together serve as one or more computing devices 22 whose control module 20 is employable to orchestrate the operation of the vehicle 10, in whole or in part. Specifically, the control module 20 operates the vehicle systems 12 based on information about the vehicle 10.

Accordingly, as a prerequisite to operating the vehicle systems 12, the control module 20 gathers information about the vehicle 10, including the information about the vehicle 10 detected by the sensor system 14. The control module 20 then evaluates the information about the vehicle 10, and operates the vehicle systems 12 based on its evaluation.

The vehicle systems 12 are part of, mounted to, or otherwise supported by the body. The vehicle systems 12 may be housed, in whole or in part, in any combination of the passenger compartment, the engine compartment, or elsewhere in the vehicle 10. Each vehicle system 12 includes one or more vehicle elements. On behalf of the vehicle system 12 to which it belongs, each vehicle element is operable to perform, in whole or in part, any combination of vehicle functions with which the vehicle system 12 is associated. It will be understood that the vehicle elements, as well as the vehicle systems 12 to which they belong, may but need not be mutually distinct.

The vehicle systems 12 include an energy system 24 and a propulsion system 26. The energy system 24 and the propulsion system 26 are connected to one another. Moreover, the drivetrain is mechanically connected to the propulsion system 26. The propulsion system 26 and the drivetrain together serve as a powertrain for the vehicle 10. The energy system 24 is operable to perform one or more energy functions, including but not limited to storing and otherwise handling energy. The propulsion system 26 is operable to perform one or more propulsion functions using energy from the energy system 24, including but not limited to powering the wheels 42.

Figure 1B:
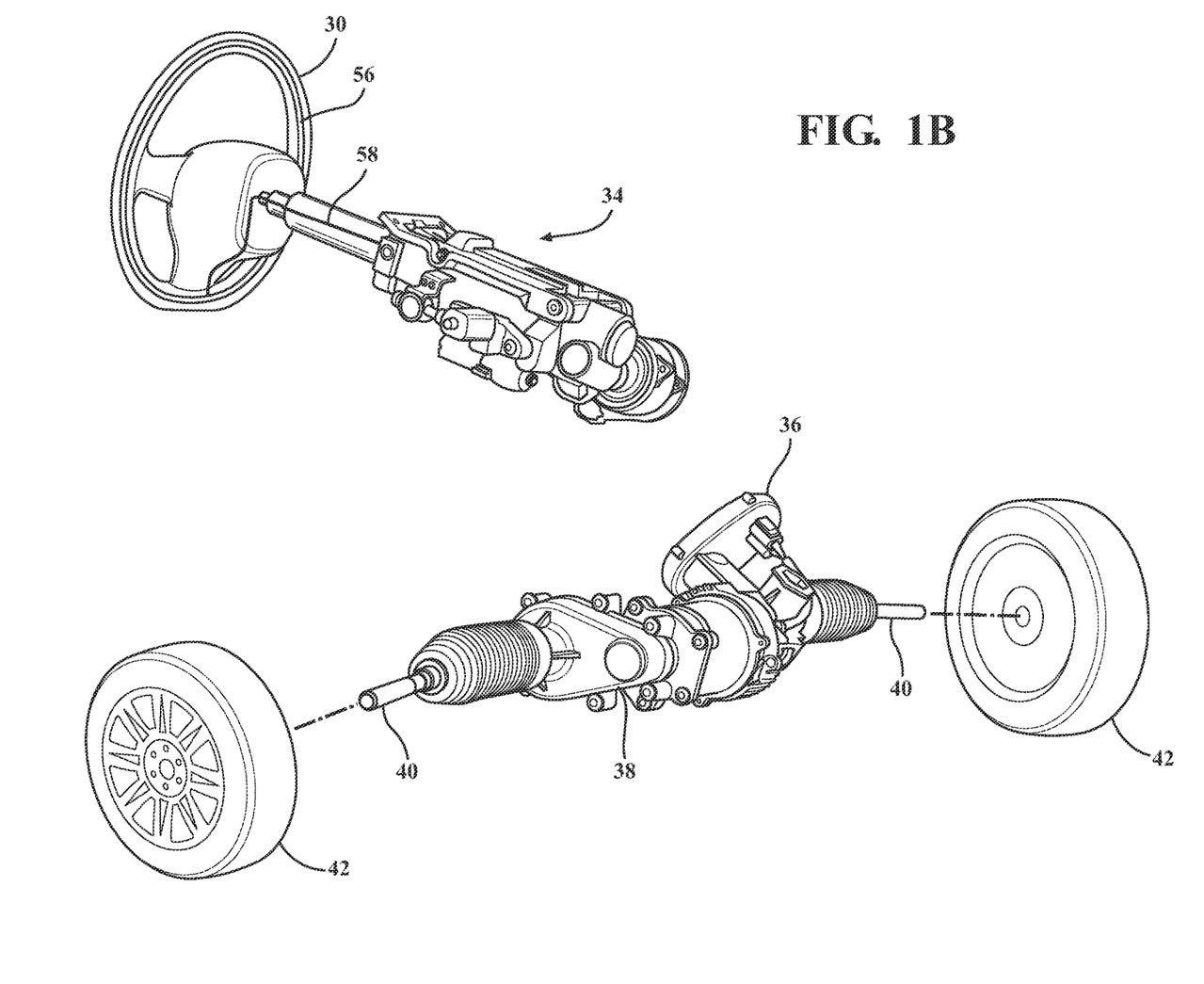
FIG. 1B is an example of a steer-by-wire system for a vehicle.

As shown with additional reference to FIG. 1B, in addition to the energy system 24, the propulsion system 26, and the like, the vehicle systems 12 include a steer-by-wire (i.e., a mechanically uncoupled steering) system 28. The steer-by-wire system 28 is operable to perform one or more steering functions, including but not limited to steering the vehicle 10.

Among the steering elements of the steer-by-wire system 28, the vehicle 10 includes a user-operated steering wheel 30 on the dash assembly or otherwise housed in the passenger compartment, a steering mechanism at one, some, or all of the wheels 42, and a torque feedback unit 32 at the steering wheel 30. The steering mechanism is mechanically connected to the wheels 42. The wheels 42 have an adjustable steering angle, and the steering mechanism is operable to adjust the steering angle. As a product of adjusting the steering angle, the steering mechanism is operable to steer the vehicle 10 as it drives along the ground. The torque feedback unit 32 is mechanically connected to the steering wheel 30. The torque feedback unit 32 is operable to apply torque to the steering wheel 30.

The steering wheel 30 can be a conventional steering wheel typical of a traditional mechanically coupled steering system. The steer-by-wire system 28 uses electrical or electro-mechanical steering elements for performing steering functions that are traditionally achieved in a mechanically coupled steering system by mechanical linkages, including but not limited to, by the operation of the steering mechanism, adjusting the steering angle in response to user operation of the steering wheel 30, and, by the operation of the torque feedback unit 32, applying a baseline torque to the steering wheel 30 for haptically simulating steering feel through the steering wheel 30.

As part of the steering mechanism, the steer-by-wire system 28 includes a steering actuator 34, a pinion 36, a rack 38, and tie-rods 40. The pinion 36, the rack 38, and the tie-rods 40 are mechanically connected to the wheels 42. The pinion 36, the rack 38, and the tie-rods 40 can be conventional steering elements configured to adjust the steering angle by rotating the pinion 36. The steering actuator 34 is mechanically connected to the pinion 36. The steering actuator 34 includes an electric motor operable to rotate the pinion 36. By the operation of the electric motor, as a product of rotating the pinion 36, the steering actuator 34 is operable to change the steering angle mechanically independently of user operation of the steering wheel 30. The torque feedback unit 32 includes an electric motor operable to apply torque to the steering wheel 30. By operation of the electric motor, the torque feedback unit 32 is operable to apply the baseline torque to the steering wheel 30 for haptically simulating steering feel through the steering wheel 30. Without application of the baseline torque, the steering wheel 30 would freely turn and the user would not experience haptic resistance and/or haptic feedback through the steering wheel 30 typical of mechanically coupled steering systems.

As part of the sensor system 14, the vehicle 10 includes one or more user sensors 44, one or more vehicle sensors 46, and one or more environment sensors 48. The user sensor(s) 44 are configured to detect, determine, assess, monitor, measure, quantify, acquire, and/or sense information about a user (e.g., driver) of the vehicle 10. For example, the user sensor(s) 44 can detect movements of the user's head and/or movements of the user's eyes to determine when the user is distracted or fatigued. The user sensor(s) 44 can be located in the passenger compartment of the vehicle 10. The user sensor(s) 44 can be operatively connected to the computing device(s) 22. The user sensor(s) 44 can include any suitable technology, now known or later developed, configured to perform these processes. For example, the user sensor(s) 44 can include one or more gaze detectors and/or one or more interior cameras. In some arrangements, the user sensor(s) 44 can be part of driver monitoring systems typical of vehicles, for example, fatigue detection systems, security systems, etc.

The user sensor(s) 44 can also be in communicative connection with the user's personal devices 70, for example, a user's cell phone, tablet, smartwatch, etc. The user sensor(s) 44 can be configured to collect and/or receive information from the user's personal devices 70. For example, the user sensor(s) 44 can collect and/or receive notifications, entertainment media, and/or location information from the user's personal devices 70. The user sensor(s) 44 can be communicatively connected to the user's personal devices 70 through physical connections and/or through one or more communication networks (e.g., Wi-Fi, Bluetooth, etc.).

The vehicle sensor(s) 46 monitor the vehicle 10 in real-time. The vehicle sensor(s) 46, on behalf of the sensor system 14, are operable to detect information about the vehicle 10, including information about user requests and information about the operation of the vehicle 10. For example, the vehicle sensor(s) 46 can be configured to detect and/or acquire data about various operating parameters of the vehicle 10. For example, the vehicle sensor(s) 46 can include one or more speedometers, one or more gyroscopes, one or more accelerometers, one or more inertial measurement units (IMUs), one or more wheel sensors, one or more steering angle sensors, one or more controller area network (CAN) sensors, one or more turn signal sensors, one or more brake pressure sensors, and the like. Relatedly, among information about the operation of the vehicle 10, the sensor system 14 is operable to detect the location and motion of the vehicle 10, including its speed, acceleration, orientation, rotation, direction, and the like, the movement of the wheels 42, the steering angle, and the operational statuses of one, some, or all of the vehicle systems 12.

The environment sensor(s) 48 can be configured to detect, determine, assess, monitor, measure, quantify, acquire, and/or sense data or information about the external environment in which the vehicle 10 is located or one or more portions thereof. The environment sensor(s) 48 can include one or more exterior cameras, such as wide-angle cameras and/or fish-eye cameras. The environment sensor(s) 48 can include one or more exterior sensors, such as temperature sensor, weather sensors, LIDAR, RADAR, etc. The environment sensor(s) 48 can be located on an exterior of the vehicle 10 or can be located in any other suitable location on the vehicle 10. Using the environment sensor(s) 48, the vehicle systems 12 can determine information about the external environment of the vehicle 10. For example, the vehicle systems 12 can determine the road conditions and/or the weather. The vehicle systems 12 can also identify traffic signs and signals, lane markers, and adjacent vehicles, pedestrians, bicyclists, motorcyclists, etc. The vehicle systems 12 can also identify blind spots of the vehicle 10 and whether there are adjacent vehicles, pedestrians, bicyclists, motorcyclists, etc. in one of the blind spots.

In addition to the sensor system 14, the vehicle 10 also includes a steering wheel detection system 50. The steering wheel detection system 50 is configured to detect information about user operation of the steering wheel 30. The steering wheel detection system 50 includes one or more steering wheel angle sensors 52 operatively connected to the steering wheel 30. Among other information about user operation of the steering wheel 30, the steering wheel angle sensor(s) 52 are configured to detect the angle of the steering wheel 30 (i.e., how far the steering wheel 30 is turned by the user), the angular velocity of the steering wheel 30 (i.e., how fast the steering wheel 30 is turned by the user), etc.

Among other information about user operation of the steering wheel 30, the steering wheel detection system 50 is also configured to detect information about user securement of the steering wheel 30. For example, the steering wheel detection system 50 can be configured to determine the number of hands on the steering wheel 30, the number of fingers on the steering wheel 30, the position of one or more hands and/or fingers on the steering wheel 30, and/or the grip strength on the steering wheel 30. In order to determine this information, the steering wheel detection system 50 includes one or more steering wheel detection sensors 54.

The steering wheel detection sensor(s) 54 can be any suitable sensors. For example, the steering wheel detection sensor(s) 54 can be one or more hands-off-detection (HOD) sensors or one or more hands-on-wheel (HOW) sensors. In one implementation, the steering wheel detection sensor(s) 54 include a sensor mat 56 and a wiring harness 58. The sensor mat 56 is integrated in the steering wheel 30. For example, the sensor mat 56 can be embedded in the steering wheel 30 under the outer cover of the steering wheel 30. Accordingly, the sensor mat 56 is not impacted by water, humidity, or sweat from the user's hands and does not affect the aesthetics of the steering wheel 30. The sensor mat 56 can be flexible and configured to wrap substantially all the way around the circumference of the steering wheel 30. The steering wheel 30 can also include a steering wheel 30 heater that does not significantly interfere with the sensor mat 56.

The sensor mat 56 includes one or more capacitive sensors and/or electrodes. When a user's hands are on the steering wheel 30, the sensor mat 56 measures the current flowing from the sensors and/or electrodes towards the vehicle 10 ground. The current is proportional to the capacitance. The capacitance increases or decreases depending on the number of hands and/or fingers on the steering wheel 30 and/or the grip strength on the steering wheel 30. Moreover, the location of the capacitance along the sensor mat 56 indicates the hand positioning on the steering wheel 30. Accordingly, the sensor mat 56 can determine how many hands the user has on the steering wheel 30, where the hands are placed, and the grip strength of the hands on the steering wheel 30.

The wiring harness 58 is located in the central hub of the steering wheel 30 and is communicatively connected to the sensor mat 56 and the computing device(s) 22. The wiring harness 58 is configured to receive data and/or information about user securement of the steering wheel 30 (e.g., information from the sensor mat 56) and communicate it to the computing device(s) 22.

Based on the information about user securement of the steering wheel 30, the computing device(s) 22 calculate a supplementary torque to be applied to the steering wheel 30. The supplementary torque can be applied to the steering wheel 30 by the torque feedback unit 32. For example, the computing device(s) 22 can operate the torque feedback unit 32 to apply the supplementary torque to the steering wheel 30. The supplementary torque is configured to haptically issue a communication through the steering wheel 30, as will be described in further detail below.

The vehicle 10 also includes user controls 60, including but not limited to an accelerator pedal 62, a brake pedal 64, and the steering wheel 30. The accelerator pedal 62 and the brake pedal 64 can be a conventional accelerator pedal and a conventional brake pedal typical of vehicles 10. The user controls 60 serve as interfaces between users of the vehicle 10 and the vehicle 10 itself, and are operable to receive mechanical, verbal, and other user inputs requesting vehicle functions. In conjunction with corresponding user controls, and in conjunction with the sensor system 14, the vehicle 10 includes an accelerator pedal sensor, a brake pedal sensor, a steering wheel sensor, and the like. Relatedly, among information about user requests, the sensor system 14 is operable to detect user inputs requesting powering the wheels 42, braking the vehicle 10, steering the vehicle 10, and the like.

The vehicle systems 12, the sensor system 14, the processors 16, the memory 18, and the control module 20 may be leveraged to implement a human machine interface (HMI) system 66 based on the steering wheel 30. The HMI system 66 provides an interface between the user and the vehicle 10 itself through the steering wheel 30 by the operation of the torque feedback unit 32 to apply torque to the steering wheel 30. Specifically, in addition to applying the baseline torque to the steering wheel 30 for haptically simulating steering feel through the steering wheel 30, the torque feedback unit 32 is operable to apply the supplementary torque to the steering wheel 30 for haptically issuing communications through the steering wheel 30. In the vehicle 10, the vehicle systems 12, the sensor system 14, the processors 16, the memory 18, and the control module 20 leveraged to implement the HMI system 66 may be part of one or more other control systems typical of vehicles 10 or may be dedicated to the HMI system 66.

Moreover, the vehicle systems 12, the sensor system 14, the processors 16, the memory 18, and the control module 20 may be leveraged to implement an advanced driver assistance system (ADAS) 68. The ADAS 68 can include one or more components of the HMI system 66, including the computing device(s) 22, the user sensor(s) 44, the vehicle sensor(s) 46, and the environment sensor(s) 48, among other components typical of an ADAS 68. The ADAS 68 will be described in further detail below in connection with the HMI system 66.

Figure 2:
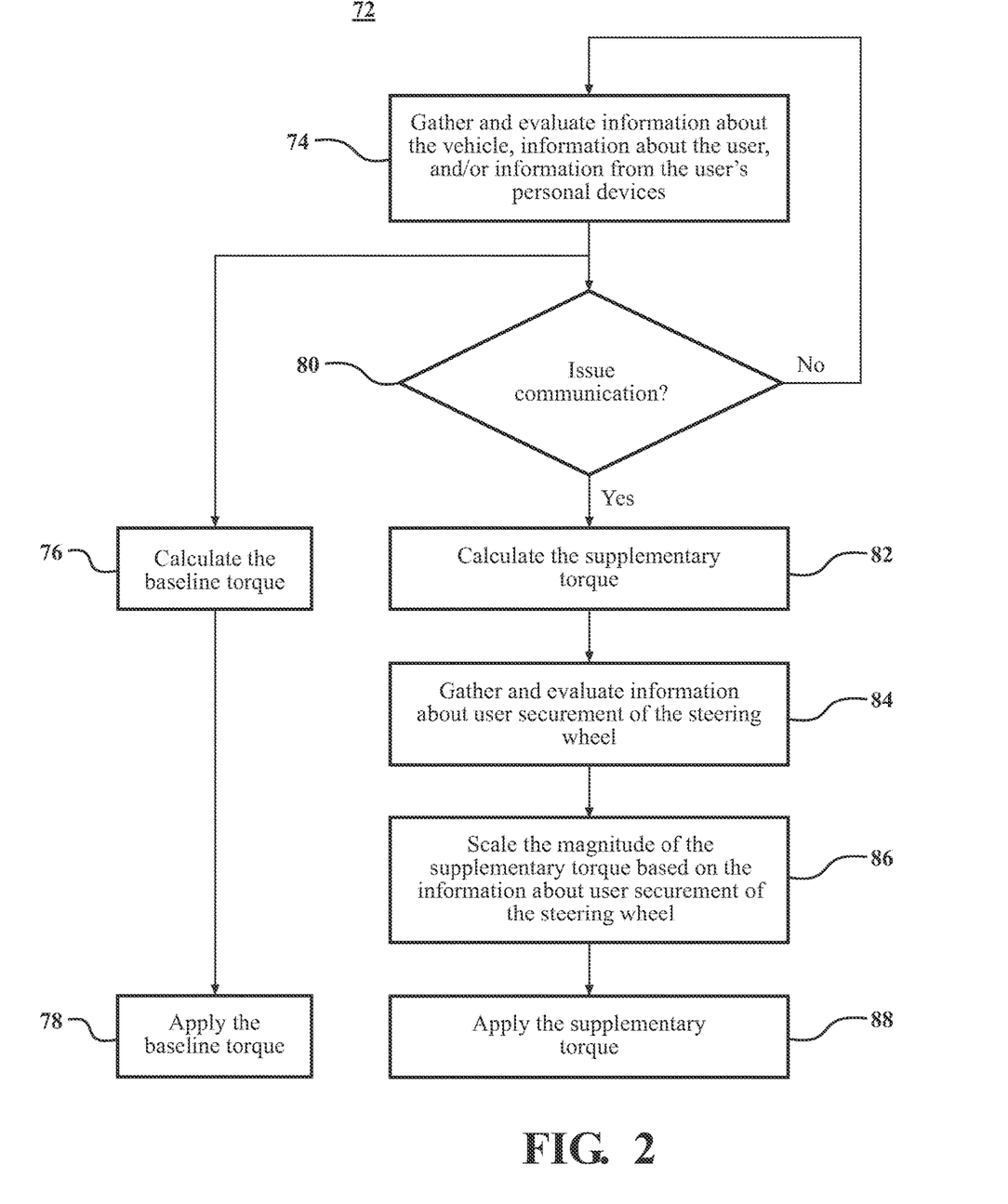
FIG. 2 is an example of a method for an HMI system of a vehicle.

The operations of a process 72 for operating the steer-by-wire system 28 are shown in FIG. 2. According to the process, the control module 20 operates the torque feedback unit 32 of the steer-by-wire system 28 to apply the baseline torque and the supplementary torque to the steering wheel 30.

In operation 74, the control module 20 gathers and evaluates information about the vehicle 10, information about the user, and/or information from the user's personal devices 70. This operation includes gathering information from the steering wheel angle sensor(s) 52, including the steering angle and other information about user operation of the steering wheel 30 received from the steering wheel detection system 50. Based on this information, the computing device(s) 22 calculate how much the pinion 36 needs to be rotated. The steering actuator 34 is actuated based on this calculation to rotate the pinion 36. The pinion 36 angle sensor is operatively connected to the pinion 36 and is configured to detect the rotation of the pinion 36 (i.e., how much the pinion 36 is rotated). The pinion 36 angle sensor sends this feedback to the computing device(s) 22 to create a feedback loop to ensure that the steering angle is correctly adjusted in response to user operation of the steering wheel 30.

In operation 76, which can be performed in conjunction with operation 74, the computing device(s) 22 calculate the baseline torque to apply to the steering wheel 30. The baseline torque haptically simulates the steering feel of a mechanically coupled steering system through the steering wheel 30. For example, the baseline torque is varied based on the angle of the steering wheel 30, how far the steering wheel 30 is turned, and/or how fast the steering wheel 30 is turned, etc. The baseline torque can also be varied based on information obtained by the vehicle sensor(s) 46. For example, the baseline torque can be varied based on the speed of the vehicle 10 and/or the traction between the wheels 42 and the road. The baseline torque can also be varied based on information obtained by the environment sensor(s) 48. For example, the baseline torque can be varied based on the road conditions and/or the weather conditions. The baseline torque can also be varied based on any other conditions or parameters that typically affect the steering of the vehicle 10. The baseline torque is applied to the steering wheel 30 in operation 78.

The baseline torque can be applied to the steering wheel 30 substantially at all times while the vehicle 10 is in operation unless there is no need for the baseline torque (e.g., when the vehicle 10 is driving straight, when the vehicle 10 is parked, or when the vehicle 10 is not in operation). When the baseline torque is not applied to the steering wheel 30, the steering wheel 30 is able to freely turn and the user does not experience haptic resistance and/or haptic feedback through the steering wheel 30 typical of mechanically coupled steering systems when the baseline torque is not applied to the steering wheel 30.

Referring back to operation 74, the control module 20 also gathers information for evaluation from the sensor system 14. This information includes information about the user, information from the user's personal devices 70, information about the vehicle 10, information about the external environment of the vehicle 10, and/or information about user securement of the steering wheel 30. More specifically, the HMI system 66, in conjunction with the control module 20, can collect and/or determine information about the user, for example, whether the user is distracted or fatigued. The HMI system 66 can collect and/or determine information about the vehicle 10 itself, for example, the speed and direction the in which the vehicle 10 is traveling, and the lane in which the vehicle 10 is traveling. The HMI system 66 can collect and/or determine information about the external environment of the vehicle 10, for example, the road conditions, the weather, traffic signs and signals, lane markers, adjacent vehicles, pedestrians, bicyclists, or motorcyclists, blind spots, etc. The HMI system 66 can also collect information from the user's personal devices 70, for example, notifications, entertainment media, and/or location information, for example, from the user's personal cellphone, and can determine when the user has received a communication (such as a text, an email, or a phone call) to his or her personal device(s) 70.

In operation 80, the control module 20 is configured to determine whether a communication should be issued haptically through the steering wheel 30 based on the information about the user, information from the user's personal devices 70, information about the vehicle 10, and/or information about the external environment of the vehicle 10. The communication is a communication related to the HMI system 66. For example, the communication can be a driving maneuver suggestion, a lane change suggestion, a lane recentering suggestion, a phone call notification, an email notification, a text message notification, and/or a notification to alert or wake a fatigued and/or sleeping user.

In operation 82, the control module 20 calculates the supplementary torque. The supplementary torque has a magnitude. The magnitude is the strength of the supplementary torque applied to the steering wheel 30. The magnitude can be based on the type of communication. For example, when the communication is a driving maneuver suggestion, the magnitude of the supplementary torque can be relatively larger, and when the communication is a notification, the magnitude of the supplementary torque can be relatively smaller.

The supplementary torque also has a spatial component, a temporal component, and a spatial-temporal component. The spatial component is the direction in which the supplementary torque is applied (e.g., clockwise or counterclockwise). For example, if the communication is a lane change suggestion for the user to change lanes to the right, the supplementary torque can be applied in the clockwise direction. The temporal component is the duration for which the supplementary torque is applied. For example, when the communication is a driving maneuver suggestion, the duration of the supplementary torque can be relatively longer, and when the communication is a notification, the duration of the supplementary torque can be relatively shorter. The spatial-temporal component is the combination of the direction and the duration of the supplementary torque. For example, when the communication is a notification or an alert to wake a fatigued user the supplementary torque can be applied in a vibratory fashion.

The control module 20 can determine the spatial component (i.e., the direction) of the supplementary torque using the vehicle systems 12, specifically, the sensor system 14 and/or the ADAS. For example, if the vehicle systems 12 determine that the vehicle 10 is driving in a lane, and is drifting out of the lane towards the right side of the vehicle 10, the control module 20 can determine that the supplementary torque should be applied to the steering wheel 30 in a counterclockwise direction. Contrariwise, if the vehicle systems 12 determine that the vehicle 10 is driving in a lane, and is drifting out of the lane towards the left side of the vehicle 10, the control module 20 can determine that the supplementary torque should be applied to the steering wheel 30 in a clockwise direction. In another example, if the vehicle systems 12 determine that the vehicle 10 is driving in a lane with an adjacent vehicle in the adjacent lane to the left of the vehicle 10 in the blind spot of the vehicle 10, and the user of the vehicle 10 does not see the adjacent vehicle and begins to turn into that lane, the control module 20 can determine that the supplementary torque should be applied to the steering wheel 30 in a clockwise direction. Contrariwise, if the vehicle systems 12 determine that the vehicle 10 is driving in a lane with an adjacent vehicle in the adjacent lane to the right of the vehicle 10 in the blind spot of the vehicle 10, and the user of the vehicle 10 does not see the adjacent vehicle and begins to turn into that lane, the control module 20 can determine that the supplementary torque should be applied to the steering wheel 30 in a counter-clockwise direction. In another example, if the vehicle systems 12 determine that there is an obstruction or obstacle in the road, the control module 20 can determine if the vehicle 10 should travel around the obstacle in the left or right direction, and determine in which direction the supplementary torque should be applied based on the driving suggestion.

In operation 84, the control module 20 also gathers information for evaluation from the steering wheel detection system 50. This information includes information about user securement of the steering wheel 30, including how many hands and/or fingers are on the steering wheel 30, the positioning of the hands and/or fingers on the steering wheel 30, and the grip strength of the hands/and or fingers on the steering wheel 30. Based on this information, the control module 20 can be configured to scale the magnitude of the supplementary torque, as shown in operation 86. Scaling the magnitude of the supplementary torque based on user securement of the steering wheel 30 can increase or improve comfortability of driving the vehicle 10 when communications are issued haptically through the steering wheel 30. For example, if the user has only one hand on the steering wheel 30, and a strong supplementary torque is applied, the user may have to over correct the steering of the vehicle 10. Scaling the magnitude of the supplementary torque allows the user to experience the same amount of resistance on the steering wheel 30 regardless of how he or she is engaging the steering wheel 30.

The supplementary torque can have a decreasingly downscaled magnitude with decreasing user securement of the steering wheel 30. For example, the magnitude of the supplementary torque is downscaled if the user has one hand or a few fingers on the steering wheel 30, is not gripping the steering wheel 30 firmly, and/or has their hands in a position where they are less secure on the steering wheel 30. For example, when the information about user securement of the steering wheel 30 indicates that the user has one hand on the steering wheel 30, the supplementary torque can have a half scaled magnitude. Contrariwise, the supplementary torque has an increasingly upscaled magnitude with increasing user securement of the steering wheel 30. For example, the magnitude of the supplementary torque is upscaled if the user has two hands or many fingers on the steering wheel 30, is gripping the steering wheel 30 firmly, and/or has their hands in a position where they are secure on the steering wheel 30. For example, when the information about user securement of the steering wheel 30 indicates that the user has two hands on the steering wheel 30, the supplementary torque can have a fully scaled magnitude.

In operation 88, the control module 20 is configured to cause the supplementary torque to be applied to the steering wheel 30. Specifically, the torque feedback unit 32 is operated by the control module 20 to apply the supplementary torque to the steering wheel 30. Accordingly, the communication is issued haptically through the steering wheel 30. Accordingly, The supplementary torque can be applied in normal, non-emergency driving situations. For example, the supplementary torque can be applied in so-called "shared control" driving situations, where the control module 20, while perhaps identifying driving maneuver suggestions, nonetheless identifies that the user's control of the vehicle 10 through the steering wheel 30 is rule abiding, safe, and otherwise feasible. For instance, the control module 20 may identify a normal driving situation directly or by implication in the absence of an emergency driving situation. In normal driving situations, in accordance with the user's presumptive intentions, the control module 20 operates the steering actuator 34 to adjust the steering angle substantially in response to user operation of the steering wheel 30, including the resulting angle of the steering wheel 30, angular velocity of the steering wheel 30, etc. As such, the supplementary torque is not directed, for example, to performing a full or partial take-over driving maneuver in emergency driving situations. Accordingly, in terms of strength, direction, duration, etc., it will be understood that the supplementary torque is generally limited, readily opposable, and otherwise non-disruptive to the user's control of the vehicle 10 through the steering wheel 30. Contrariwise, it will be understood that the supplementary torque is not aimed at opposing, dominating, overtaking, or otherwise disrupting the user's control of the vehicle 10 through the steering wheel 30.

In any of these examples, the baseline torque has a magnitude that is unscaled regardless of the information about user securement of the steering wheel 30. The baseline torque may be unscaled so that the user receives the correct mechanical steering feedback from the vehicle. If the baseline torque is scaled, the user may oversteer the vehicle.

With reference once again to FIG. 1A, as noted above, the processors 16, the memory 18, and the control module 20 together serve as the computing device(s) 22 whose control module 20 orchestrates the operation of the vehicle 10, including but not limited to the operation of the vehicle systems 12. The control module 20 may be a global control module. Relatedly, as part of a central control system, the vehicle 10 may include a global control unit (GCU) to with which the control module 20 is communicatively connected. Alternatively, the control module 20 may be a global control module. Relatedly, as part of a central control system, the vehicle 10 may include a global control unit (GCU) to which the control module 20 belongs. Although the vehicle 10, as shown, includes one control module 20, it will be understood that this disclosure is applicable in principle to otherwise similar vehicles including multiple control modules 20.

The processors 16 may be any components configured to execute any of the processes described herein or any form of instructions to carry out such processes or cause such processes to be performed. The processors 16 may be implemented with one or more general-purpose or special-purpose processors. Examples of suitable processors include microprocessors, microcontrollers, digital signal processors or other forms of circuitry that execute software. Other examples of suitable processors include without limitation central processing units (CPUs), array processors, vector processors, digital signal processors (DSPs), field programmable gate arrays (FPGAs), programmable logic arrays (PLAs), application specific integrated circuits (ASICs), programmable logic circuitry or controllers. The processors 16 may include at least one hardware circuit (e.g., an integrated circuit) configured to carry out instructions contained in program code. In arrangements where there are multiple processors 16, the processors 16 may work independently from each other or in combination with one another.

The memory 18 is a non-transitory computer readable medium. The memory 18 may include volatile or nonvolatile memory, or both. Examples of suitable memory include random access memory (RAM), flash memory, read only memory (ROM), programmable read only memory (PROM), erasable programmable read only memory (EPROM), electrically erasable programmable read only memory (EEPROM), registers, magnetic disks, optical disks, hard drives, or any other suitable storage medium, or any combination of these. The memory 18 includes stored instructions in program code. Such instructions are executable by the processors 16 or the control module 20. The memory 18 may be part of the processors 16 or the control module 20, or may be communicatively connected the processors 16 or the control module 20.

Generally speaking, the control module 20 includes instructions that may be executed by the processors 16. The control module 20 may be implemented as computer readable program code that, when executed by the processors 16, execute one or more of the processes described herein. Such computer readable program code may be stored on the memory 18. The control module 20 may be part of the processors 16, or may be communicatively connected the processors 16.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An HMI system, comprising:
    a steer-by-wire system for a vehicle, the steer-by-wire system including a steering wheel operable by a user and a torque feedback unit mechanically connected to the steering wheel; and
    a control module communicatively connected to the torque feedback unit, the control module configured to identify a communication, gather information about user securement of the steering wheel, haptically simulate mechanical steering feel by operating the torque feedback unit to apply, substantially at all times while the vehicle is in operation except when the vehicle is parked or driving straight, a baseline torque to the steering wheel, the baseline torque having a magnitude that is unscaled based on the information, and haptically issue the communication through the steering wheel by operating the torque feedback unit to apply, in a manner that is readily opposable by the user, nondisruptive to control of the vehicle by the user, and limited in duration, a supplementary torque to the steering wheel, the supplementary torque having a magnitude that is scaled based on the information.

2. The HMI system of claim 1, wherein the supplementary torque has a decreasingly downscaled magnitude when the information about user securement of the steering wheel is indicative of decreasing user securement of the steering wheel.

3. The HMI system of claim 1, wherein the information about user securement of the steering wheel is indicative of a number of hands on the steering wheel, and wherein the supplementary torque has an upscaled magnitude when the information about user securement of the steering wheel is indicative of two hands on the steering wheel, and a downscaled magnitude when the information about user securement of the steering wheel is indicative of one hand on the steering wheel.

4. The HMI system of claim 1, wherein the information about user securement of the steering wheel is indicative of a number of hands on the steering wheel, and wherein the supplementary torque has a fully scaled magnitude when the information about user securement of the steering wheel is indicative of two hands on the steering wheel, and a half scaled magnitude when the information about user securement of the steering wheel is indicative of one hand on the steering wheel.

5. The HMI system of claim 1, wherein the information about user securement of the steering wheel is indicative of a number of fingers on the steering wheel, and wherein the supplementary torque has a decreasingly downscaled magnitude when the information about user securement of the steering wheel is indicative of a decreasing number of fingers on the steering wheel.

6. The HMI system of claim 1, wherein the information about user securement of the steering wheel is indicative of grip strength on the steering wheel, and wherein the supplementary torque has a decreasingly downscaled magnitude when the information about user securement of the steering wheel is indicative of decreasing grip strength on the steering wheel.

7. The HMI system of claim 1, wherein the communication is at least one of a driving maneuver suggestion and a notification, the driving maneuver suggestion including at least one of a lane recentering suggestion and a lane change suggestion, and the notification including at least one of an email notification, a text message notification, and a phone call notification.

8. The HMI system of claim 1, wherein the supplementary torque can be counterbalanced by the user without causing a change in direction of a movement of the vehicle.

9. The HMI system of claim 1, wherein the supplementary torque is applied in a vibratory fashion such that the supplementary torque directs the attention of the user to the communication.

10. The HMI system of claim 1, wherein the control module is configured to haptically simulate mechanical steering feel and haptically issue the communication by operating the torque feedback unit to apply, to the steering wheel, the baseline torque and the supplementary torque at the same time.

11. The HMI system of claim 1, wherein the control module includes instructions to gather the information about user securement of the steering wheel using a sensor mat integrated in the steering wheel.

12. A method of operating an HMI system for a vehicle, comprising:
    identifying a communication;
    calculating a supplementary torque for haptically issuing the communication through a steering wheel of the vehicle that is operable by a user;
    gathering information about user securement of the steering wheel;

scaling the supplementary torque based on the information;

operating a torque feedback unit mechanically connected to the steering wheel to apply, substantially at all times while the vehicle is in operation except when the vehicle is parked or driving straight, a baseline torque to the steering wheel that haptically simulates mechanical steering feel; and operating the torque feedback unit to apply, in a manner that is readily opposable by the user, non-disruptive to control of the vehicle by the user, and limited in duration, the supplementary torque to the steering wheel.

13. The method of claim 12, further comprising:

gathering information about at least one of an external environment of the vehicle, a user of the vehicle, and one or more devices of the user, wherein identifying a communication is based on the information about at least one of the external environment of the vehicle, the user of the vehicle, and the one or more devices of the user.

14. The method of claim 12, wherein gathering information about user securement of the steering wheel includes gathering, using a sensor mat integrated in the steering wheel, information about at least one of a number of hands on the steering wheel, a number of fingers on the steering wheel, hand positioning on the steering wheel, and grip strength on the steering wheel.

15. The method of claim 12, wherein operating the torque feedback unit to apply the baseline torque to the steering wheel and operating the torque feedback unit to apply the supplementary torque to the steering wheel are performed at the same time.

16. The method of claim 12, wherein the supplementary torque has an upscaled magnitude when the information about user securement of the steering wheel is indicative of two hands on the steering wheel, and a downscaled magnitude when the information about user securement of the steering wheel is indicative of one hand on the steering wheel.

17. The method of claim 12, wherein the supplementary torque has a fully scaled magnitude when the information about user securement of the steering wheel is indicative of two hands on the steering wheel, and a half scaled magnitude when the information about user securement of the steering wheel is indicative of one hand on the steering wheel.

18. An HMI system, comprising:

a steer-by-wire system for a vehicle including a steering wheel operable by a user and a torque feedback unit mechanically connected to the steering wheel;

a steering wheel detection system that detects information about user securement of the steering wheel indicative of a number of hands on the steering wheel; and a control module communicatively connected to the torque feedback unit and the steering wheel detection system, the control module configured to haptically simulate mechanical steering feel by operating the torque feedback unit to apply, substantially at all times while the vehicle is in operation except when the vehicle is parked or driving straight, a baseline torque to the steering wheel, the baseline torque having a magnitude that is unscaled based on the information, the control module further configured to haptically issue a driving maneuver suggestion by applying, in a manner that is readily opposable by the user, non-disruptive manner to the user's control of the vehicle, and limited in duration, a supplementary torque to the steering wheel, the supplementary torque having an upscaled magnitude when the information is indicative of two hands on the steering wheel, and a downscaled magnitude when the information is indicative of one hand on the steering wheel.

19. The HMI system of claim 18, wherein the supplementary torque has a fully scaled magnitude when the information about user securement of the steering wheel is indicative of two hands on the steering wheel, and a half scaled magnitude when the information about user securement of the steering wheel is indicative of one hand on the steering wheel.

20. The HMI system of claim 18, wherein the driving maneuver suggestion is at least one of a lane recentering suggestion and a lane change suggestion.

\* \* \* \* \*